US012681741B2

(12) United States Patent
Fan et al.

(10) Patent No.: US 12,681,741 B2
(45) Date of Patent: Jul. 14, 2026

(54) VIRTUAL VOLUME PLACEMENT BASED ON ACTIVITY LEVEL

(71) Applicant: Dell Products L.P., Round Rock, TX (US)

(72) Inventors: Huijuan Fan, Chengdu (CN); Bob Yan, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 575 days.

(21) Appl. No.: 17/735,737

(22) Filed: May 3, 2022

(65) Prior Publication Data

US 2023/0333874 A1      Oct. 19, 2023

(30) Foreign Application Priority Data

Apr. 15, 2022    (CN) .......................... 202210397556.3

(51) Int. Cl.
*G06F 9/455*          (2018.01)
*G06F 9/50*           (2006.01)

(52) U.S. Cl.
CPC .......... *G06F 9/45558* (2013.01); *G06F 9/455* (2013.01); *G06F 9/50* (2013.01); *G06F 9/505* (2013.01); *G06F 9/5072* (2013.01); *G06F 9/5077* (2013.01); *G06F 2009/4557* (2013.01); *G06F 2009/45579* (2013.01); *G06F 2009/45583* (2013.01)

(58) Field of Classification Search
CPC ................. G06F 9/455; G06F 9/45558; G06F 2009/4557; G06F 2009/45579; G06F 2009/45583; G06F 2009/45591; G06F 9/50; G06F 9/505; G06F 9/5072; G06F 9/5077; G06F 3/0622; G06F 3/0665; G06F 3/067
See application file for complete search history.

(56) References Cited

U.S. PATENT DOCUMENTS

| | | | | |
|---|---|---|---|---|
| 10,089,136 B1 * | 10/2018 | Zhang | .................... | G06F 11/301 |
| 10,613,794 B1 * | 4/2020 | Verma | .................... | G06F 3/0604 |
| 2002/0091722 A1 * | 7/2002 | Gupta | .................... | H04L 43/00 |

(Continued)

OTHER PUBLICATIONS

"VSphere Storage", VMware, Inc., available at: https://docs.vmware.com/en/VMware-vSphere/7.0/vsphere-esxi-vcenter-server-703-storage-guide.pdf (last accessed May 23, 2022), last updated Dec. 13, 2021, pp. 313-342.

*Primary Examiner* — Charles M Swift
(74) *Attorney, Agent, or Firm* — Ryan, Mason & Lewis, LLP

(57)          ABSTRACT

Methods, apparatus, and processor-readable storage media for placement of virtual volumes based on activity levels are provided herein. An example computer-implemented method includes obtaining a request to create a new virtual volume on a storage cluster comprising a plurality of storage nodes; determining a total activity level for each of a plurality of storage nodes of the storage cluster in response to the request, wherein the total activity level for a given storage node is determined based at least in part on an activity level value of each virtual volume currently hosted on the storage node; selecting one of the plurality of storage nodes to host the new virtual volume based at least in part on the determined total activity levels; and creating the new virtual volume on the selected storage node.

20 Claims, 7 Drawing Sheets

(56)  References Cited

U.S. PATENT DOCUMENTS

| | | | | |
|---|---|---|---|---|
| 2014/0156956 A1* | 6/2014 | Ezra | ........................ | G06F 3/065 |
| | | | | 711/162 |
| 2015/0026306 A1* | 1/2015 | Moon | ................. | H04L 41/5096 |
| | | | | 709/219 |
| 2015/0058475 A1* | 2/2015 | Earl | .................... | G06F 9/45558 |
| | | | | 709/224 |
| 2015/0244599 A1* | 8/2015 | Nagai | ..................... | H04L 67/10 |
| | | | | 709/223 |
| 2015/0248253 A1* | 9/2015 | Kim | ..................... | G06F 3/0643 |
| | | | | 707/723 |
| 2017/0168866 A1* | 6/2017 | Kono | ................. | G06F 9/45558 |

* cited by examiner

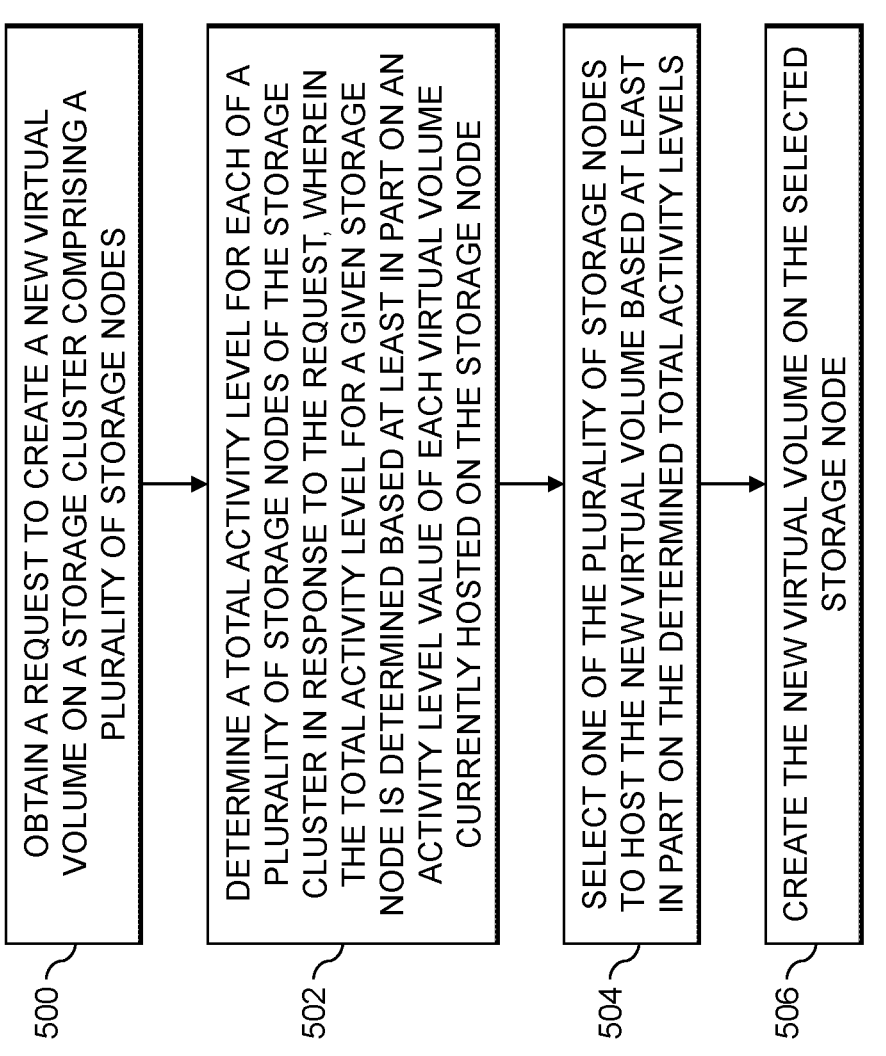

500 OBTAIN A REQUEST TO CREATE A NEW VIRTUAL VOLUME ON A STORAGE CLUSTER COMPRISING A PLURALITY OF STORAGE NODES

502 DETERMINE A TOTAL ACTIVITY LEVEL FOR EACH OF A PLURALITY OF STORAGE NODES OF THE STORAGE CLUSTER IN RESPONSE TO THE REQUEST, WHEREIN THE TOTAL ACTIVITY LEVEL FOR A GIVEN STORAGE NODE IS DETERMINED BASED AT LEAST IN PART ON AN ACTIVITY LEVEL VALUE OF EACH VIRTUAL VOLUME CURRENTLY HOSTED ON THE STORAGE NODE

504 SELECT ONE OF THE PLURALITY OF STORAGE NODES TO HOST THE NEW VIRTUAL VOLUME BASED AT LEAST IN PART ON THE DETERMINED TOTAL ACTIVITY LEVELS

506 CREATE THE NEW VIRTUAL VOLUME ON THE SELECTED STORAGE NODE

FIG. 5

VIRTUAL VOLUME PLACEMENT BASED ON ACTIVITY LEVEL

RELATED APPLICATION

The present application claims priority to Chinese Patent Application No. 202210397556.3, filed on Apr. 15, 2022 and entitled "Virtual Volume Placement Based on Activity Level," which is incorporated by reference herein in its entirety.

FIELD

The field relates generally to information processing systems, and more particularly to storage in such systems.

BACKGROUND

Information processing systems increasingly utilize reconfigurable virtual resources to meet changing user needs in an efficient, flexible and cost-effective manner. For example, cloud computing environments are often implemented using various types of virtualization techniques. Such techniques illustratively include operating system level virtualization techniques such as Linux containers. Such containers may be used to provide at least a portion of the cloud infrastructure of a given information processing system. Other types of virtualization such as virtual machines implemented using a hypervisor can additionally or alternatively be used.

SUMMARY

Illustrative embodiments of the disclosure provide techniques for virtual volume placement based on activity level. An exemplary computer-implemented method includes obtaining a request to create a new virtual volume on a storage cluster comprising a plurality of storage nodes; determining a total activity level for each of a plurality of storage nodes of the storage cluster in response to the request, wherein the total activity level for a given storage node is determined based at least in part on an activity level value of each virtual volume currently hosted on the storage node; selecting one of the plurality of storage nodes to host the new virtual volume based at least in part on the determined total activity levels; and creating the new virtual volume on the selected storage node.

Illustrative embodiments can provide significant advantages relative to conventional virtual volume placement techniques. For example, challenges associated with the placement of virtual volumes among storage nodes are overcome in one or more embodiments by determining activity levels of virtual volumes residing on each of a plurality of storage nodes and selecting one of the storage nodes based at least in part on the computed activity levels to create a new virtual volume.

These and other illustrative embodiments described herein include, without limitation, methods, apparatus, systems, and computer program products comprising processor-readable storage media.

BRIEF DESCRIPTION OF THE DRAWINGS

FIG. 5 shows a flow diagram of a process for virtual volume placement based on activity level in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
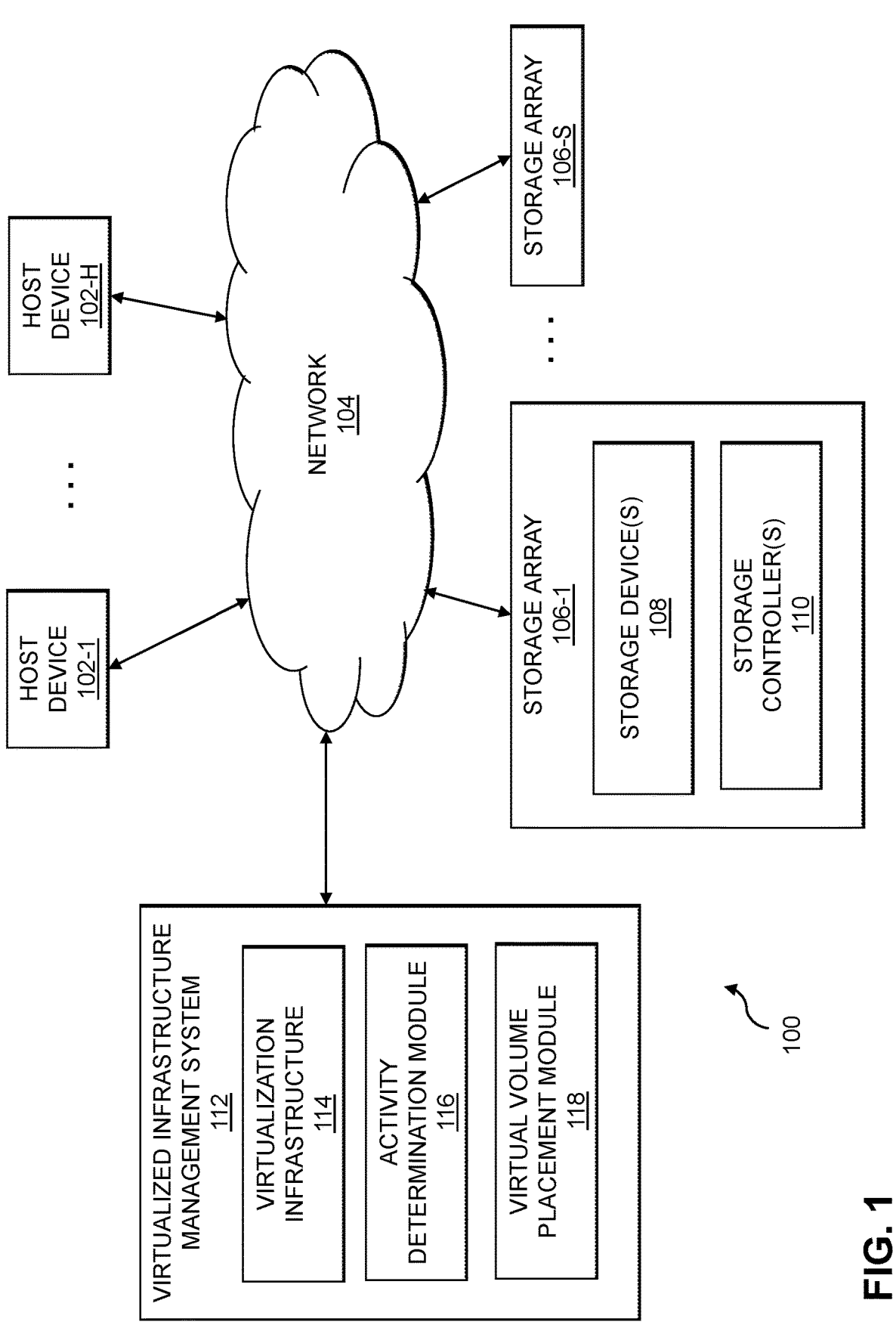
FIG. 1 is a block diagram of an information processing system configured for placing virtual volumes based at least in part on activity levels of storage processors in an illustrative embodiment.

FIG. 1 is a block diagram of an information processing system 100 configured for placing virtual volumes based at least in part on activity levels of storage processors in an illustrative embodiment. The information processing system 100 comprises one or more host devices 102-1, . . . 102-H (collectively, host devices 102) that communicate over a network 104 with a virtualized infrastructure management system 112. The virtualized infrastructure management system 112 includes virtualization infrastructure 114 for managing VMs associated with one or more users (e.g., of the host devices 102). User data for VMs provided using the virtualization infrastructure 114 may be stored on virtual volumes in one or more datastores. Each of the datastores may host multiple virtual volumes for one or more VMs. One or more storage arrays 106-1, . . . 106-S (collectively, storage arrays 106) are also coupled to the network 104, and provide the underlying physical storage used by the datastores in the virtualized infrastructure management system 112. The storage arrays 106 may represent respective storage nodes of a storage cluster that hosts virtual volumes for the VMs provided using the virtualization infrastructure 114. The network 104, in some embodiments, may comprise a storage area network (SAN). Additional details of a virtualization environment that utilizes virtual volume storage are described in conjunction with FIG. 2, for example.

The storage array 106-1, as shown in FIG. 1, comprises a plurality of storage devices 108 each storing data utilized by one or more of applications running on the host devices 102 (e.g., where such applications may include one or more applications running in VMs associated with the virtualized infrastructure management system 112, including potentially the VMs themselves). The storage devices 108 are illustratively arranged in one or more storage pools. The storage array 106-1 also comprises one or more storage controllers 110 that facilitate 10 processing for the storage devices 108. The storage array 106-1 and its associated storage devices 108 are an example of what is more generally referred to herein as a "storage system." This storage system in the present embodiment is shared by the host devices 102, and is therefore also referred to herein as a "shared storage system." In embodiments where there is only a single host device 102, the host device 102 may be configured to have exclusive use of the storage system.

The host devices 102 and virtualization infrastructure 114 of the virtualized infrastructure management system 112 illustratively comprise respective computers, servers or other types of processing devices capable of communicating with the storage arrays 106 via the network 104. For example, the virtualization infrastructure 114 of the virtualized infrastructure management system 112 may implement respective VMs of a compute services platform or other type of processing platform. Similarly, at least a subset of the host devices 102 may be implemented as respective VMs of a compute services platform or other type of processing platform. The host devices 102 and/or virtualization infrastructure 114 of the virtualized infrastructure management system 112 in such an arrangement illustratively provide compute services such as execution of one or more applications on behalf of each of one or more users (e.g., associated with respective ones of the host devices 102 and/or the virtualized infrastructure management system 112).

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 108 of the storage array 106-1 may implement logical units (LUNs) configured to store objects for users associated with the host devices 102 (e.g., such as for VMs associated with the virtualized infrastructure management system 112 utilized by the users of the host devices 102). These objects can comprise files, blocks or other types of objects. The host devices 102 interact with the storage array 106-1 utilizing read and write commands as well as other types of commands that are transmitted over the network 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 106-1 to include different portions of one or more physical storage devices. Storage devices 108 may therefore be viewed as comprising respective LUNs or other logical storage volumes.

The virtualized infrastructure management system 112, as noted above, includes virtualization infrastructure 114 for managing VMs associated with one or more users (e.g., of the host devices 102). Examples of processing platforms that may be used to provide the virtualization infrastructure 114 will be described in further detail below in conjunction with FIGS. 6 and 7. The virtualized infrastructure management system 112 further includes an activity determination module 116 and a virtual volume placement module 118. The activity determination module 116 is configured to compute virtual volume activity levels associated with the storage arrays 106. The virtual volume activity levels, in some embodiments, are computed by evaluating 10 access frequency probabilities for different types of virtual volumes, as discussed in more detail elsewhere herein.

The virtual volume placement module 118, in at least some embodiments, is configured to select and place one or more new virtual volumes across different storage nodes (e.g., different ones of the storage arrays 106) based on the computed activity levels.

At least portions of the functionality of the activity determination module 116 and virtual volume placement module 118 may be implemented at least in part in the form of software that is stored in memory and executed by a processor.

Although shown as external to the host devices 102 and storage arrays 106 in the FIG. 1 embodiment, it should be appreciated that the virtualized infrastructure management system 112 in other embodiments may be implemented at least in part internal to one or more of the host devices 102 and/or one or more of the storage arrays 106 (e.g., such as on the storage controllers 110 of storage array 106-1). For example, one or more of the host devices 102 and/or storage arrays 106 may provide at least a portion of the virtualization infrastructure 114 for supporting VMs and datastores storing user data (e.g., virtual volumes) for the VMs.

The host devices 102, storage arrays 106, and the virtualized infrastructure management system 112 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

The host devices 102, the storage arrays 106 and the virtualized infrastructure management system 112 may be implemented on respective distinct processing platforms, although numerous other arrangements are possible. For example, in some embodiments at least portions of one or more of the host devices 102, the storage arrays 106 and the virtualized infrastructure management system 112 are implemented on the same processing platform. The virtualized infrastructure management system 112, one or more of the storage arrays 106, or combinations thereof, can therefore be implemented at least in part within at least one processing platform that implements at least a subset of the host devices 102.

The network 104 may be implemented using multiple networks of different types to interconnect storage system components. For example, the network 104 may comprise a SAN that is a portion of a global computer network such as the Internet, although other types of networks can be part of the SAN, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Although in some embodiments certain commands used by the host devices 102 to communicate with the storage arrays 106 illustratively comprise SCSI commands, other types of commands and command formats can be used in other embodiments. For example, some embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/ TCP.

The storage array 106-1, in some embodiments, comprises a persistent memory that is implemented using a flash memory or other type of non-volatile memory of the storage array 106-1. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 108 of the storage array 106-1, although in other embodiments the persistent memory may be implemented as a designated portion or portions of one or more of the storage devices 108. For example, in some embodiments the storage devices 108 may comprise flash-based storage devices, as in embodiments involving all-flash storage arrays, or may be implemented in whole or in part using other types of non-volatile memory.

As mentioned above, communications between the host devices 102 and the storage arrays 106 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage arrays 106 and other portions of the system 100, such as the virtualized infrastructure management system 112, may in some embodiments be implemented as part of a cloud-based system.

The storage devices 108 of the storage array 106-1 can be implemented using solid state drives (SSDs). Such SSDs are implemented using non-volatile memory (NVM) devices such as flash memory. Other types of NVM devices that can be used to implement at least a portion of the storage devices 108 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 108.

The storage arrays 106 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage arrays 106 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more VMs or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. The storage arrays 106 and the virtualized infrastructure management system 112 may be implemented at least in part in the first geographic location, the second geographic location, and one or more other geographic locations. Thus, it is possible in some implementations of the system 100 for different ones of the host devices 102, the storage arrays 106 and the virtualized infrastructure management system 112 to reside in different data centers.

Numerous other distributed implementations of the host devices 102, the storage arrays 106 and the virtualized infrastructure management system 112 are possible. Accordingly, the host devices 102, the storage arrays 106 and the virtualized infrastructure management system 112 can also be implemented in a distributed manner across multiple data centers.

Additional examples of processing platforms utilized to implement portions of the system 100 in illustrative embodiments will be described in more detail below in conjunction with FIGS. 6 and 7.

It is to be understood that the particular set of elements shown in FIG. 1 is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

In some data centers or other IT infrastructure that includes virtualized infrastructure (e.g., VDI environments including multiple VMs), SAN and NAS arrays may be virtualized. For example, a VMware vSphere® virtual volumes (vVols) integration and management framework may be used to virtualize SAN and NAS arrays, enabling a more efficient operational model that, in at least some embodiments, is optimized for virtualized environments and is centered on the application instead of the infrastructure.

Generally, virtual volumes (also referred to herein as vVols) are encapsulations of VM files, virtual disks, and their derivatives. On a storage system, virtual volumes can reside in virtual volume datastores, which are also referred to as storage containers. Virtual volume datastores are a type of datastore which allows virtual volumes to map directly to a storage system at a more granular level than VM filesystem (VMFS) and Network File System (NFS) datastores. While VMFS and NFS datastores are managed and provisioned at the LUN or filesystem level, virtual volumes allow VMs or virtual disks to be managed independently. An end-user, for example, can create a virtual volume datastore based on underlying storage pools and allocate a specific portion of one or more storage pools to be used for the virtual volume datastore and its virtual volumes. A hypervisor may use NAS and SCSI Protocol Endpoints (PEs) as access points for IO communication between VMs and their virtual volume datastores on a storage system.

Accordingly, virtual volumes can be stored natively inside a storage system that is connected to one or more hosts (e.g., VMware ESXi™ hosts) through Ethernet or SAN. In some embodiments, the virtual volumes are exported as objects by a compliant storage system and are managed entirely by hardware on the storage side. Typically, a globally unique identifier (GUID) identifies a virtual volume. Virtual volumes are not preprovisioned, but created automatically when VM management operations are performed. These operations can include, for example, a VM creation operation, a cloning operation, and a snapshotting operation. One or more virtual volumes can be associated with a VM (e.g., via ESXi™ and vCenter Server).

Figure 2:
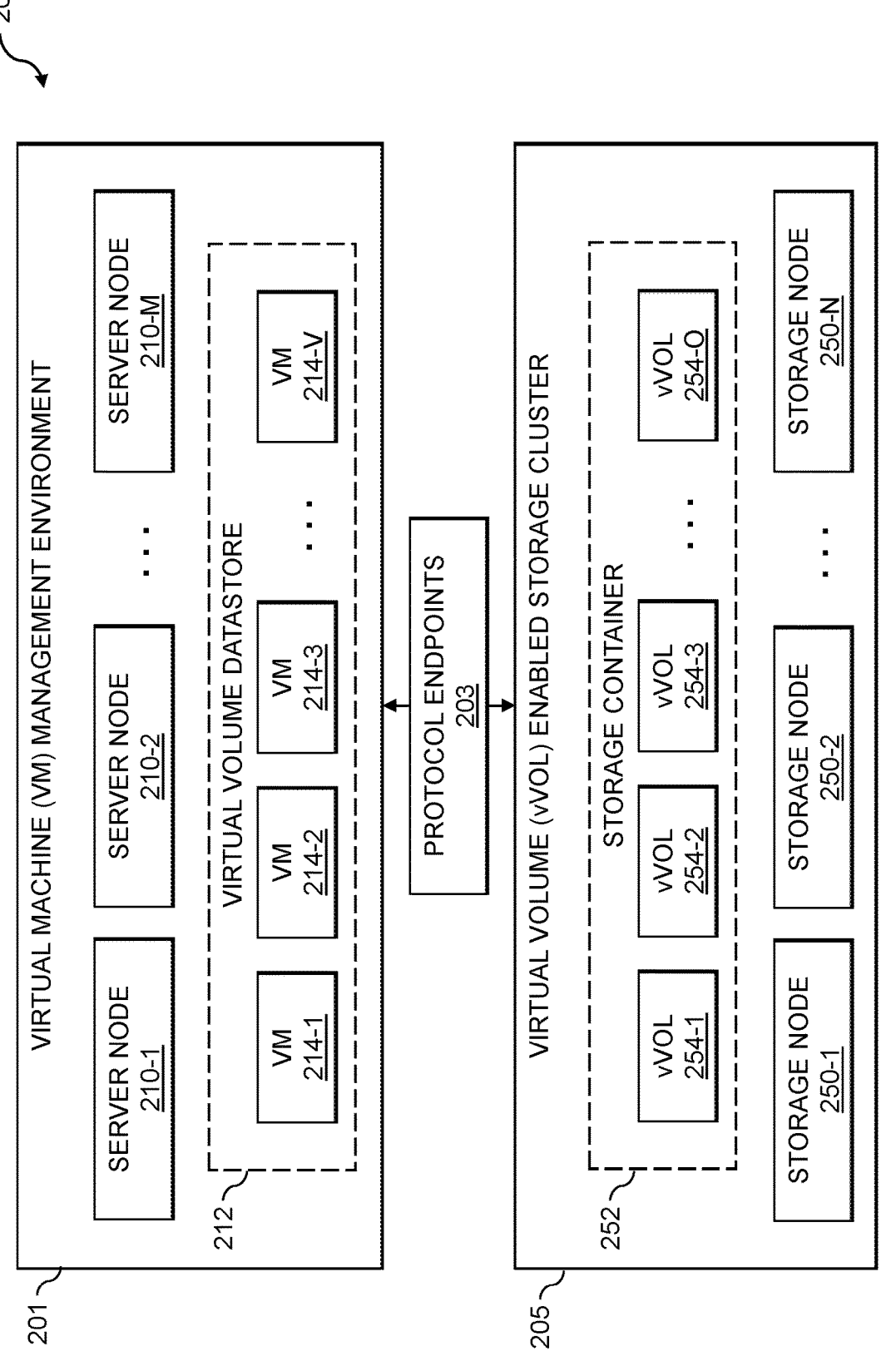
FIG. 2 illustrates a virtualization environment that utilizes virtual volume storage in an illustrative embodiment.

Referring now to FIG. 2, this figure illustrates a virtualization environment 200 that utilizes virtual volume storage in an illustrative embodiment. The virtualization environment 200 includes a VM management environment 201 (e.g., a VMware vCenter® and/or a VMware vSphere® environment) coupled via protocol endpoints 203 to a virtual volume enabled storage cluster 205. The VM management environment 201 includes a set of server nodes 210-1, 210-2, . . . 210-M (collectively, server nodes 210). The VM management environment 201 further includes a virtual volume datastore 212 for a set of VMs 214-1, 214-2, 214-3, . . . 214-V (collectively, VMs 214). The vVol enabled storage cluster 205 includes a set of storage nodes 250-1, 250-2, . . . 250-N (collectively, storage nodes 250) and a storage container 252 comprising vVols 254-1, 254-2, 254-3, . . . 254-O (collectively, vVols 254). It should be noted that the number M of server nodes 210 may be the same as or different than the number N of storage nodes 250.

The vVols 254 are exported to the VM management environment 201 (e.g., which may comprise server nodes 210 implementing respective ESXi hosts) through the PEs 203. The PEs 203 are part of the physical storage fabric, and establish a data path from the VMs 214 to their respective vVols 254 on demand. The storage nodes 250 enable data services on the vVols 254. The storage container 252 may provide a pool of storage capacity that is logically grouped into the vVols 254. The vVols 254 are created inside of the storage container 252. The storage container 252 may be presented to the server nodes 210 of the VM management environment 201 in the form of the vVol datastore 212.

Typically, there are multiple types of virtual volumes or vVols 254, which provide specific functions depending on their role in the VM management environment 201. The different types of vVols can include:

Config-vVol: A configuration virtual volume, or a home directory, represents a small directory that contains metadata files for a virtual machine (VW). Generally, there is one config-vVol for each VM. The files can include, for example, a .vmx file, descriptor files for virtual disks, and log files. The configuration virtual volume is formatted with a file system.

Data-vVol: A data virtual volume that corresponds directly to each virtual disk .vmdk file. Generally, the data-vVol holds the information previously in the VM's directory (such as a .vmx file and/or VM logs).

Swap-vVol: A swap virtual volume is created when a VM is first powered on. It is a virtual volume to hold copies of VM memory pages that cannot be retained in memory. Its size is determined by the VM's memory size.

Memory-vVol (or snapshot-vVol): A virtual memory volume that includes a complete copy of the VM memory as part of a with-memory VM snapshot.

Other vVol: A virtual volume for specific features. For example, a digest virtual volume is created for Content-Based Read Cache (CBRC).

Typically, a VM creates a minimum of three virtual volumes (e.g., a data-vVol, a config-vVol, and a swap-vVol). The maximum number of virtual volumes can depend on how many virtual disks and snapshots reside on the VM. Each VM snapshot adds one snapshot per virtual disk and one memory snapshot (if requested). As an example, a VM with three virtual disks would have five virtual volumes. Snapshotting this VM would add four more vVols, which results in a total of nine virtual volumes for this VM configuration scenario. In other examples, the number of virtual volumes can be much higher (e.g., thousands or more).

One advantage of virtual volumes is that a user can choose and manipulate service levels in at least some embodiments at the finest virtual volume granularity possible. Thus, it is important to balance workloads from virtual volumes across storage processors at the virtual volume level instead of at the VM level. It is noted that the term storage processor (SP) is intended to be broadly construed so as to encompass, for example, a storage node that provides processing resources for performing storage operations as well as servicing IO between storage and hosts.

Existing techniques for balancing virtual volume workloads generally compare the virtual volume count residing on each SP. The SP that has the least amount of virtual volume file families is selected, and a Coreboot File System (CBFS) instance is returned on the selected SP. In such a way it makes a balanced placement of Vols between SPs.

Such techniques can be inefficient as they assume that each type of virtual volume has the same IO access frequency probability. However, it is not accurate to evaluate the factual IO workload from the VM operations. For example, a config-vVol is not involved in the snapshot or clone operations. For snapshot/clone/migration operations of a VM that is powered off, there is no IO involved with the swap-vVol, and almost all the VM operations take effect on the data-vVol. Consider a scenario where a total of 100 config-vVols reside on a first SP (SPA) and a total of 1000 data-vVols reside on a second SP (SPB). Existing techniques assume the load is balanced between SPA and SPB, when in reality the IO workload on SPA is much lighter than the workload on SPB.

Embodiments described herein improve the balance placement between storage processors based on the concept of virtual volume activity level. In some embodiments, the virtual volume activity level quantifies the activity level (e.g., IO access frequency probability) of each type of virtual volume based on an Analytic Hierarchy Process (AHP) method, and when a new virtual volume is to be created, a SP that has the lowest total virtual volume activity level is selected to host the new virtual volume. Accordingly, when there is a high IO workload from the virtual environment (e.g., a VMware vCenter® and/or a VMware vSphere® environment) on VMs, the system can achieve more balanced resource consumption between different SPs. Such techniques can effectively improve the overall performance and storage efficiency of the system, thereby improving the overall user experience.

Figure 3:
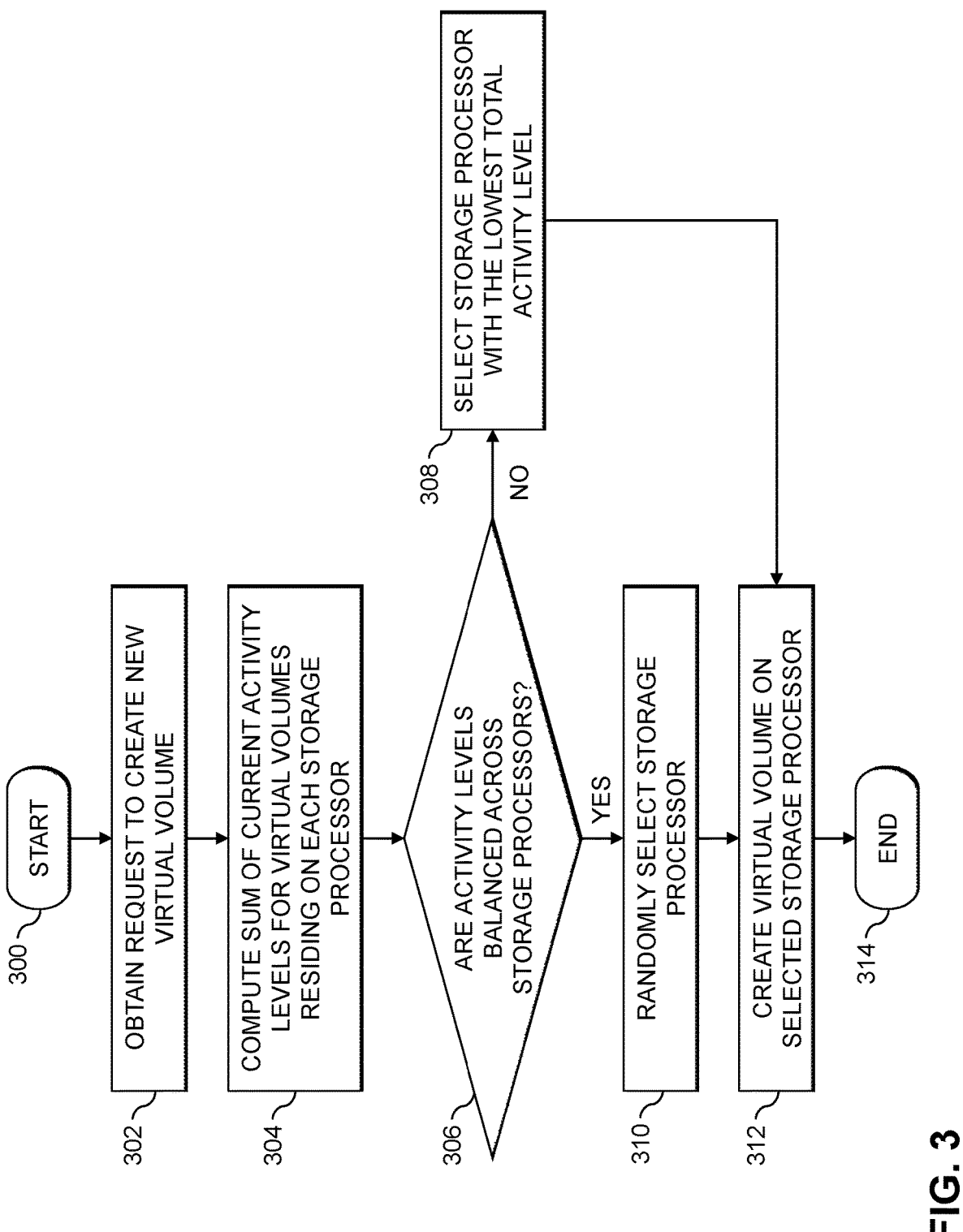
FIG. 3 is a flow diagram of an exemplary process for selecting a storage processor to place a new virtual volume in an illustrative embodiment.

Referring now to FIG. 3, this figure is a flow diagram of an exemplary process for selecting a storage processor to place a new virtual volume in an illustrative embodiment.

The FIG. 3 process starts at step 300. Step 302 includes obtaining a request to create a new virtual volume. Step 304 includes computing the sum of current activity levels for virtual volumes residing on each storage processor. Step 306 includes performing a test to check whether the activity levels are substantially balanced across the storage processors. If no, then the process continues to step 308, which includes selecting the storage processor with the lowest total activity level. If yes, then the process continues to step 310, which includes randomly selecting a storage processor. Step 312 includes creating a virtual volume on the storage processor selected at either step 308 or step 310. The process ends at step 314.

As indicated previously, the virtual volume activity level may be used to evaluate an average activity level for different types of virtual volumes. For example, as most operations from user applications (e.g., associated with host devices 102) are targeted at a VM, the virtual volume activity level can reflect the probability that a virtual volume will be accessed when its correlated VM operation occurs. In some embodiments, the virtual volume activity level can be assigned a value within a defined range. As a non-limiting example, the range of values can be between 0 and 5, where a value of 5 represents that the virtual volume is always called and/or involved in a particular VM event, and where a value of 0 represents the virtual volume is never called and/or involved in a particular VM event. Accordingly, a higher virtual volume activity level indicates a higher probability that a virtual volume is accessed in a random VM event, which in turn leads to a higher workload for this virtual volume on the storage system. The value assigned to a particular virtual volume can be based on its corresponding type. For example, a data-vVol type tends to be called in most VM events (e.g., creation, clone, migration, snapshot, deletion, and/or replication operations), whereas a swap-vVol is typically called for only some events (such as when a VM is powered on and a swap file is used), but not for other events (such as when taking a snapshot on a VM that is powered off).

One or more embodiments include maintaining and periodically updating the virtual volume activity levels for different types of virtual volumes. The virtual volume activity level may be determined based on one or more user applications (e.g., associated with host devices 102) and can reflect the access probability of a particular type of virtual volume for a specified time period. Also, although some embodiments are described herein with reference to five types of virtual volumes (as is the case in a VMware vSphere® environment, for example), this is not intended to be limiting, and in other embodiments there can be a different number of virtual volume types. For example, the number of types can be specified according to specific scenario. In this regard, the accuracy of the evaluation of workloads for a virtual volume can depend on the granularity of the types of virtual volumes for a given scenario.

One or more embodiments include applying an AHP to determine the virtual volume activity level of each type of virtual volume. Generally, AHP is an effective approach for quantifying the weights of decision criteria in a complex decision-making scenario. More specifically, AHP reduces complex decisions to a series of pairwise comparisons, and then synthesizes the results, which can help capture both subjective and objective aspects of a decision. AHP provides a rational framework for a needed decision by quantifying its criteria and alternative options, and for relating those elements to the overall goal. In addition, AHP incorporates a useful technique for checking the consistency of the evaluations of a decision maker, thus reducing bias in the decision-making process. Typically, AHP can be broken down into the following three parts: structuring the goal or problem trying to be solved, defining possible solutions (referred to as alternatives), and structuring decision criteria used to judge the alternatives on.

Figure 4:
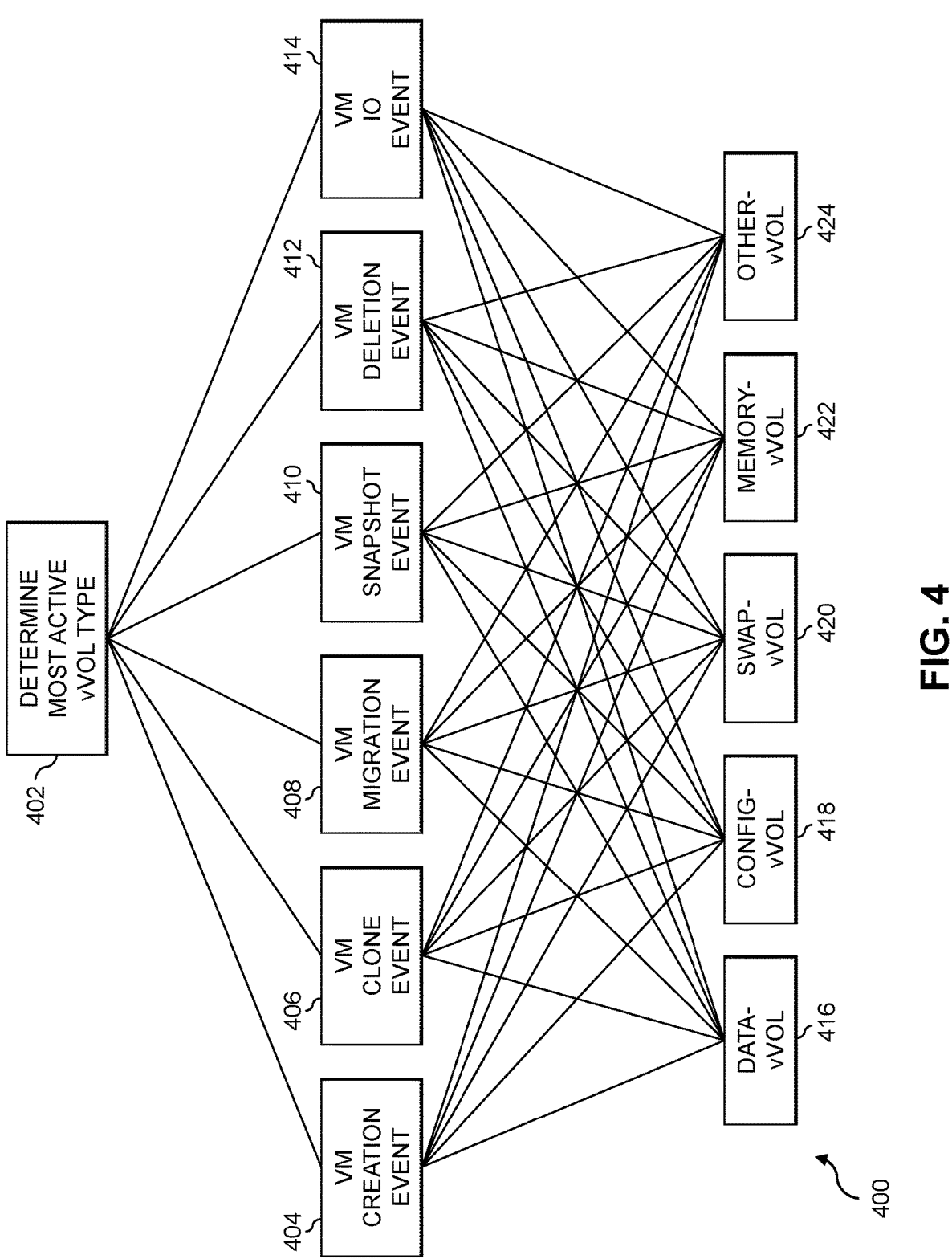
FIG. 4 is a diagram depicting a structure of an analytic hierarchy process in an illustrative embodiment.

Referring also to FIG. 4, this figure shows a diagram depicting a structure 400 of an AHP for determining activity levels of virtual volumes in an illustrative embodiment. The structure 400 includes node 402 that corresponds to a goal of the AHP process, which in this example is to determine the most active vVol type. In some embodiments, the goal can include determining the activity level value of each vVol type. Nodes 404-414 of structure 400 represent the criteria of the AHP process. More specifically, nodes 404-414 define the criteria as the following common event operations: VM creation event 404, VM clone event 406, VM migration event 408, VM snapshot event 410, VM deletion event 412, and VM IO event 414. For example, the VM IO event 414 may correspond to an indicator such as network bandwidth, input operations per second (IOPS), and/or other detailed indicators including user-defined indicators. In some embodiments, the criteria may also include a vVol VM replication event (not shown in FIG. 4) based on the particular storage system. Generally, different users can have different application behavior patterns, causing different frequencies of VM operations. By refining such operations at the criteria layer, some embodiments can provide a more accurate evaluation.

Also shown in FIG. 4 are alternatives of the different types of virtual volumes, which correspond to the alternatives of the AHP process. In the example shown in FIG. 4, the alternatives include: data-vVol 416, config-vVol 418, swap-vVol 420, memory-vVol 422, and other-vVol 424. Similar to the criteria definitions corresponding to nodes 404-414, the virtual volume types can be changed (e.g., increased or refined) according to the specific user scenario. As an example, a VM data disk may have a richer set of data services and performance levels associated with it compared to a VM boot disk. In such an example, a data-vVol type can be further refined into a "boot disk" virtual volume and a "data disk" virtual volume.

In some embodiments, during the AHP evaluation the vector of criteria weights and matrix of alternative scores are computed and consistency is also checked. The weights and scores are obtained on the basis of the pairwise relative evaluations of both the criteria (corresponding to nodes 404-414 of FIG. 4, for example) and options provided by the user. For example, consider a matrix A is a m×m real matrix, where m is the number of evaluation criteria/alternatives considered. Each entry $a_{jk}$ of the matrix A represents an importance of the $j^{th}$ element relative to the $k^{th}$ element. If $a_{jk} > 1$, then the $j^{th}$ element can be considered more important than the $k^{th}$ element, while if $a_{jk} < 1$, then the $j^{th}$ element can be considered less important than the $k^{th}$ element. If two elements have the same importance, then the entry $a_{jk}$ is 1. The entries $a_{jk}$ and $a_{kj}$ satisfy the following constraint:

$$a_{jk} \cdot a_{kj} = 1.$$

It is to be appreciated that $a_{jj} = 1$ for all j.

The relative importance between two elements can be measured according to a numerical scale. For example, the following table shows an example of a numerical scale from 1 to 9 for the relative scores:

| Value of $a_{jk}$ | Interpretation |
| --- | --- |
| 1 | j and k are equally important |
| 3 | j is slightly more important than k |
| 5 | j is more important than k |
| 7 | j is strongly more important than k |
| 9 | j is absolutely more important than k |
| 2, 4, 6, 8 | Intermediate values between the two adjacent judgments |

In some cases, the ratings may show slight inconsistencies, however, such inconsistencies are generally not problematic for the AHP.

By implementing AHP techniques based on pairwise evaluations, the vector of criteria weights and matrix of alternative scores are computed, and the consistency of the scores are checked, to obtain the global weight w for each type of virtual volume.

According to some embodiments, the activity level (represented as AL) of a given alternative (i.e., a type of virtual volume) is computed based on its corresponding weight w. For example, the virtual volume activity level can be limited to a range [0,5], and can be computed as: AL=5·w. It is instructive to note that the constant 5 in this equation is used because there are five different types of virtual volumes. However, it is to be appreciated that the equation can be adjusted depending on the number of virtual volume types, for example. In some embodiments, the virtual volume activity level values determined for each type of virtual volume can be used in the process described in conjunction with FIG. 3, for example.

Accordingly, one or more embodiments include a process that incorporates virtual volume activity levels to select at least one of a plurality of SPs to place a new virtual volume for an incoming virtual volume creation request. Such embodiments can include computing a current sum of activity levels for virtual volumes currently residing on each SP, and then comparing and selecting the SP with the lowest total virtual volume activity level as the location for creating the new virtual volume. If the SPs have substantially the same total virtual volume activity level (e.g., within some threshold), then the SP can be selected using some other method, such as a random selection process or a process that alternates between SPs.

FIG. 5 is a flow diagram of a process for virtual volume placement based on activity level in an illustrative embodiment. It is to be understood that this particular process is only an example, and that additional or alternative processes for placing virtual volumes across storage nodes based at least in part on virtual volume activity levels may be used in other embodiments.

In this embodiment, the process includes steps 500 through 506. These steps are assumed to be performed at least in part by the virtualized infrastructure management system 112 using the activity determination module 116 and the virtual volume placement module 118.

Step 500 includes obtaining a request to create a new virtual volume on a storage cluster comprising a plurality of storage nodes. Step 502 includes determining a total activity level for each of a plurality of storage nodes of the storage cluster in response to the request, wherein the total activity level for a given storage node is determined based at least in part on an activity level value of each virtual volume currently hosted on the storage node. Step 504 includes selecting one of the plurality of storage nodes to host the new virtual volume based at least in part on the determined total activity levels. Step 506 includes creating the new virtual volume on the selected storage node.

Each of the virtual volumes currently hosted on the given storage node may correspond to one of a plurality of virtual volume types, and the activity level value of a given one of the virtual volumes may be determined based on its corresponding virtual volume type. Each of the activity level values may indicate an average input-output activity level for a respective one of the virtual volume types. The activity level values may be computed based on an analytical hierarchy process. The analytical hierarchy process may include performing pairwise comparisons between individual ones of the plurality of virtual volume types and individual ones of a set of virtual machine operations involving one or more of the plurality of virtual volume types. The set of virtual machine operations may include one or more of: a virtual machine creation operation, a virtual machine clone operation, a virtual machine migration operation, a virtual machine snapshot operation, a virtual machine deletion operation, and a virtual machine input-output operation. The selecting may include selecting the storage node having the lowest total activity level. The selecting may include: determining that at least two of the storage nodes have substantially the same total activity level; and randomly selecting one of the at least two storage nodes to host the new virtual volume. The plurality of virtual volume types may include at least two of: a swap type of virtual volume that is created when a virtual machine is powered on; a configuration type of virtual volume comprising metadata files for a virtual machine; a data type of virtual volume that stores information previously in a directory of a virtual machine; and a memory type of virtual volume comprising a complete copy of memory of a virtual machine.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve virtual volume placement among SPs. These and other embodiments can effectively overcome problems associated with existing techniques that place new virtual volumes based on the number of virtual volumes currently residing on a given SP. For example, some embodiments are configured to compute activity levels for different types of virtual volumes and select the SP for new virtual volume based at least in part on the computed activity levels. These and other embodiments can effectively improve the efficiency of how virtual volume workloads are balanced across SPs, thereby improving the overall performance of the system relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for placing virtual volumes based on activity level will now be described in greater detail with reference to FIGS. 6 and 7. Although described in the context of system 100, these platforms may also be used to implement at least portions of other information processing systems in other embodiments.

Figure 6:
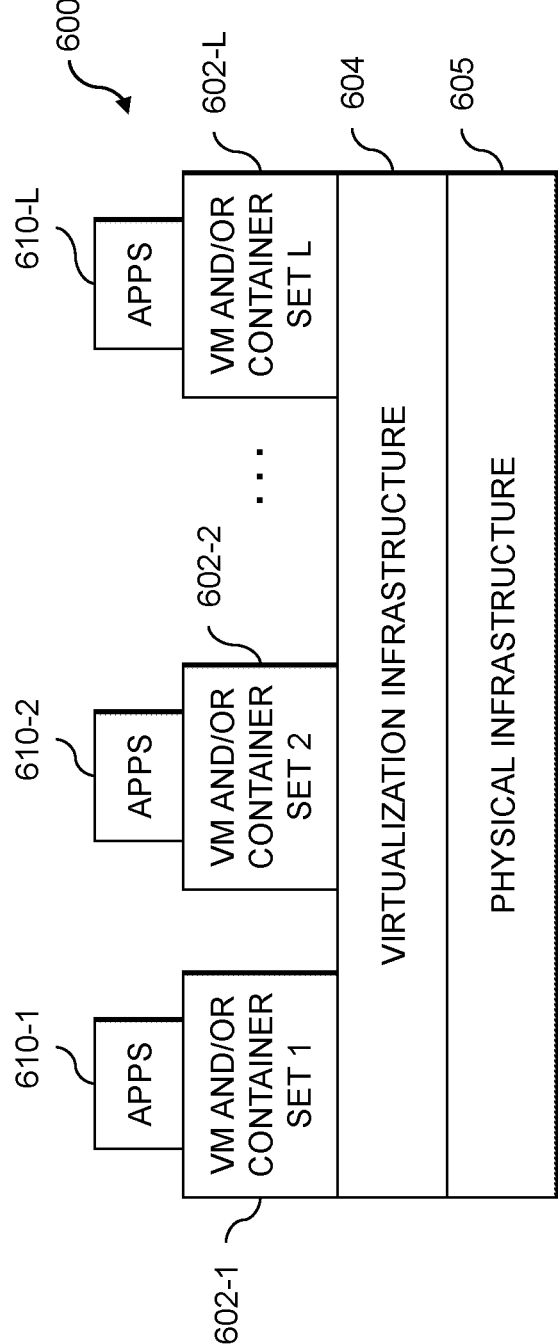
FIGS. 6 and 7 show examples of processing platforms that may be utilized to implement at least a portion of an information processing system in illustrative embodiments.
Figure 7:
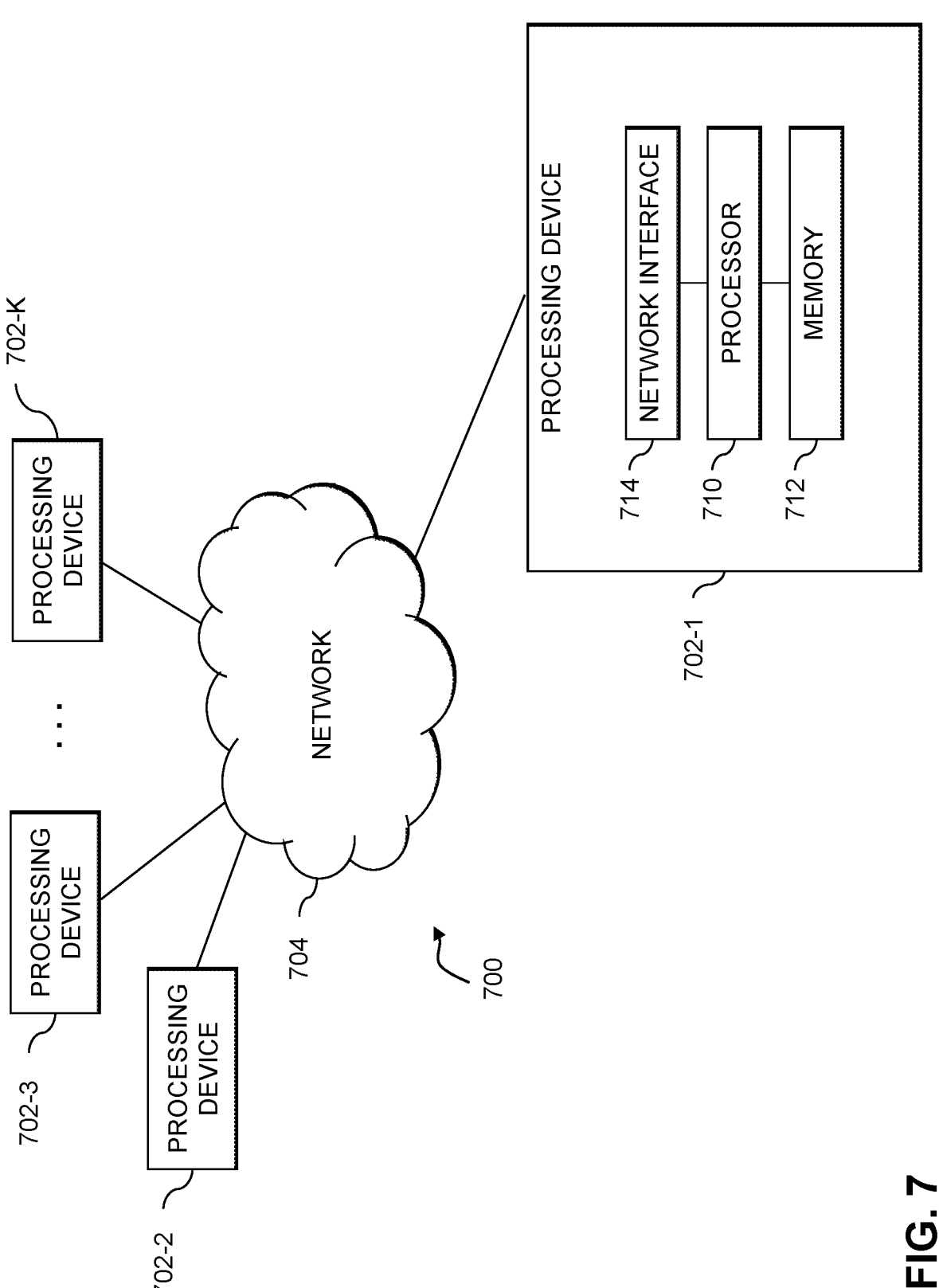

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises multiple VMs and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU), or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory, or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for placing virtual volumes based on activity levels of storage processors as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, storage systems, virtualization infrastructures, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining a request to create a new virtual volume on a storage cluster comprising a plurality of storage nodes;
determining a total activity level for each of the plurality of storage nodes of the storage cluster in response to the request, wherein the total activity level for a given storage node is determined based at least in part on an activity level value of each virtual volume currently hosted on the storage node, wherein at least two of the virtual volumes currently hosted on the storage node correspond to different virtual volume types from among a plurality of virtual volume types, each virtual volume type being associated with a distinct functional role, and wherein the activity level value of each of the at least two virtual volumes: (i) represents a probability that the virtual volume will be accessed during one or more virtual machine operations and (ii) is based at least in part on the corresponding virtual volume type;
selecting one of the plurality of storage nodes to host the new virtual volume based at least in part on the determined total activity levels; and
creating the new virtual volume on the selected storage node;
wherein the method is performed by at least one processing device comprising a processor coupled to a memory.

2. The computer-implemented method of claim 1, wherein each of the activity level values indicates an average input-output access frequency probability for a respective one of the virtual volume types.

3. The computer-implemented method of claim 1, wherein the activity level values are computed based on an analytical hierarchy process, and wherein the analytical hierarchy process comprises:
performing pairwise comparisons between individual ones of the plurality of virtual volume types and individual ones of a set of virtual machine operations involving one or more of the plurality of virtual volume types.

4. The computer-implemented method of claim 3, wherein the set of virtual machine operations comprises one or more of: a virtual machine creation operation, a virtual machine clone operation, a virtual machine migration operation, a virtual machine snapshot operation, a virtual machine deletion operation, and a virtual machine input-output operation.

5. The computer-implemented method of claim 1, wherein the selecting comprises:
selecting, from among the plurality of storage nodes, the storage node having the lowest total activity level.

6. The computer-implemented method of claim 1, wherein the selecting comprises:
determining that at least two of the storage nodes have substantially the same total activity level; and
randomly selecting one of the at least two storage nodes to host the new virtual volume.

7. The computer-implemented method of claim 1, wherein the plurality of virtual volume types comprises at least two of:
a swap type of virtual volume that is created when a virtual machine is powered on;
a configuration type of virtual volume comprising metadata files for a virtual machine;

a data type of virtual volume that stores information previously in a directory of a virtual machine; and a memory type of virtual volume comprising a complete copy of memory of a virtual machine.

8. A non-transitory processor-readable storage medium having stored therein program code of one or more software programs, wherein the program code when executed by at least one processing device causes the at least one processing device:

to obtain a request to create a new virtual volume on a storage cluster comprising a plurality of storage nodes;

to determine a total activity level for each of a plurality of storage nodes of the storage cluster in response to the request, wherein the total activity level for a given storage node is determined based at least in part on an activity level value of each virtual volume currently hosted on the storage node, wherein at least two of the virtual volumes currently hosted on the storage node correspond to different virtual volume types from among a plurality of virtual volume types, each virtual volume type being associated with a distinct functional role, and wherein the activity level value of each of the at least two virtual volumes: (i) represents a probability that the virtual volume will be accessed during one or more virtual machine operations and (ii) is based at least in part on the corresponding virtual volume type;

to select one of the plurality of storage nodes to host the new virtual volume based at least in part on the determined total activity levels; and to create the new virtual volume on the selected storage node.

9. The non-transitory processor-readable storage medium of claim 8, wherein each of the activity level values indicates an average input-output access frequency probability for a respective one of the virtual volume types.

10. The non-transitory processor-readable storage medium of claim 8, wherein the activity level values are computed based on an analytical hierarchy process, and wherein the analytical hierarchy process comprises:

performing pairwise comparisons between individual ones of the plurality of virtual volume types and individual ones of a set of virtual machine operations involving one or more of the plurality of virtual volume types.

11. The non-transitory processor-readable storage medium of claim 10, wherein the set of virtual machine operations comprises one or more of: a virtual machine creation operation, a virtual machine clone operation, a virtual machine migration operation, a virtual machine snapshot operation, a virtual machine deletion operation, and a virtual machine input-output operation.

12. The non-transitory processor-readable storage medium of claim 8, wherein the selecting comprises:

selecting, from among the plurality of storage nodes, the storage node having the lowest total activity level.

13. The non-transitory processor-readable storage medium of claim 8, wherein the selecting comprises:

determining that at least two of the storage nodes have substantially the same total activity level; and randomly selecting one of the at least two storage nodes to host the new virtual volume.

14. An apparatus comprising:

at least one processing device comprising a processor coupled to a memory;

the at least one processing device being configured:

to obtain a request to create a new virtual volume on a storage cluster comprising a plurality of storage nodes;

to determine a total activity level for each of a plurality of storage nodes of the storage cluster in response to the request, wherein the total activity level for a given storage node is determined based at least in part on an activity level value of each virtual volume currently hosted on the storage node, wherein at least two of the virtual volumes currently hosted on the storage node correspond to different virtual volume types from among a plurality of virtual volume types, each virtual volume type being associated with a distinct functional role, and wherein the activity level value of each of the at least two virtual volumes: (i) represents a probability that the virtual volume will be accessed during one or more virtual machine operations and (ii) is based at least in part on the corresponding virtual volume type;

to select one of the plurality of storage nodes to host the new virtual volume based at least in part on the determined total activity levels; and to create the new virtual volume on the selected storage node.

15. The apparatus of claim 14, wherein each of the activity level values indicates an average input-output access frequency probability for a respective one of the virtual volume types.

16. The apparatus of claim 14, wherein the activity level values are computed based on an analytical hierarchy process, and wherein the analytical hierarchy process comprises:

performing pairwise comparisons between individual ones of the plurality of virtual volume types and individual ones of a set of virtual machine operations involving one or more of the plurality of virtual volume types.

17. The apparatus of claim 16, wherein the set of virtual machine operations comprises one or more of: a virtual machine creation operation, a virtual machine clone operation, a virtual machine migration operation, a virtual machine snapshot operation, a virtual machine deletion operation, and a virtual machine input-output operation.

18. The apparatus of claim 14, wherein the selecting comprises:

selecting, from among the plurality of storage nodes, the storage node having the lowest total activity level.

19. The apparatus of claim 14, wherein the selecting comprises:

determining that at least two of the storage nodes have substantially the same total activity level; and randomly selecting one of the at least two storage nodes to host the new virtual volume.

20. The apparatus of claim 14, wherein the plurality of virtual volume types comprises at least two of:

a swap type of virtual volume that is created when a virtual machine is powered on;

a configuration type of virtual volume comprising metadata files for a virtual machine;

a data type of virtual volume that stores information previously in a directory of a virtual machine; and a memory type of virtual volume comprising a complete copy of memory of a virtual machine.

* * * * *